Patented June 27, 1933

1,915,544

UNITED STATES PATENT OFFICE

CHARLES G. MOORE, OF LAKEWOOD, AND MILTON ZUCKER, OF CLEVELAND, OHIO, ASSIGNORS TO THE GLIDDEN COMPANY, OF CLEVELAND, OHIO, A CORPORATION OF OHIO

SYNTHETIC RESIN AND METHOD OF MAKING

No Drawing.   Application filed July 1, 1929. Serial No. 375,321.

This invention relates to synthetic resins of the polyhydric alcohol-polybasic acid type, and more particularly to novel products and procedures wherein the reaction is modified so that the undesired tendency to gel is diminished, the acid number is decreased and the water resistance improved.

It has been known for some time that polyhydric alcohols and polybasic acids may be condensed to form resinous reaction products. In 1901, J. Watson Smith reported in the Journal of the Society of Chemical Industry, 1075, that glycerol and phthalic anhydride could be condensed to a resinous glyceryl phthalate. Numerous investigators have studied the reaction since. Various materials have been suggested for primary components. Glycerol, polyglycerol, glycols, polyglycols, and other polyhydric alcohols have been used, and phthalic, malic, succinic, citric, and other acids. Most usually glycerol and phthalic anhydride have been employed, the glyceryl phthalate resins formed being generally known as glyptal resins. It was discovered at an early date that where only glycerol and phthalic anhydride are employed, the reaction proceeds at a very rapid rate at elevated temperatures (around 250° C.). Condensation first occurs; before this is completed, polymerization sets in; and at a definite point in the reaction, gelling occurs, in an exothermic reaction. At this critical point, the resin changes to an insoluble, infusible, mass which is valuable for molding.

Where it is desired to use the resin for the manufacture of spirit varnish, it is of course necessary to hold the reaction on the soluble side of the critical point. In the past, this has been accomplished by esterifying secondary acids with the glyceryl phthalate. Numerous types have been employed but the cheapest and most readily available are the higher mono-basic aliphatic acids obtained by hydrolysis of the fatty oils, and the acids of the more highly acid resins such as rosin. Where resin acids are used, the product obtained is very brittle, due to the resin admixture; and the material is far from waterproof, since the resin acids are deficient in this respect; (probably due to their acidic character, OH groups present providing an affinity for water).

With the use of the resins of the fatty drying oils, a tough, elastic product can be obtained, but certain difficulties attach to the manufacture. If the percentage of oil formed is allowed to fall below 25–30 per cent., the resin gels very rapidly so that the reaction cannot easily be controlled. If the percentage of oil is allowed to rise above 40–45 per cent., the resin becomes soft, and the solution dries like a varnish, by evaporation and oxidation, instead of like a resin solution, by simple evaporation. If non-drying oil acids are used, the resin with over 40–45 per cent. oil remains sticky, not drying at all. Within the range indicated, good resin products can be obtained, but an unfortunate tendency to gel does not permit the reaction to be carried to nearly complete condensation. The acid numbers are high (30 to 60) and free glycerol and phthalic anhydride are present, and as these are water soluble, the resin product lacks water resistance. Furthermore, if the reaction be carried just short of the critical point, the slow continuation of the reaction in the cold solution may cause gelling in the package. These disadvantages necessarily limit the applicability of such resin products for usage in coatings.

The poor water-resistance prevents usage where the coating is wet in process, as in the wet sanding of automobile finishes, or where it is exposed to wet, or frequent washing. Practical paint men object to a varnish which, because of its high acid number, livers when ground with basic pigments like zinc oxide and carbonate white lead; and they object particularly to anything which might gel in the package, no matter how rarely this might occur. For all these reasons, the glyptal resin coatings have had only limited applicability.

In accordance with our invention however, all of these disadvantages may be overcome, and our invention contemplates in general the modification of the resins by carrying on the reaction between a polyhydric alcohol, a polybasic acid and a modifying acid, together with a neutral resin, of the coumarone, indene, polymerized coal tar hydrocarbon type.

If a mixture of 35 parts of phthalic anhydride, 22.5 parts of linseed oil acids and 17.5 parts of glycerol be reacted together (this gives 50 parts glyceryl phthalate to 25 parts oil) at 250° C., raising the temperature over a period of 60–80 minutes, gelling would occur in 45–50 minutes at the outside after temperature is reached. If however on the other hand, as in accordance with our invention, 25 parts of a coumarone resin be employed with such a reaction mixture, and heat be applied in the same manner, the reaction may be carried on for more than 150 minutes without gelling the mass. The coumarone resin imparts some water resistance, and lowers the acid number by admixture; but with the heating in the presence of resin, it further improves these properties by modifying the reaction to allow the condensation and polymerization of the other constituents to go on over a longer period of time. The residual free phthalic anhydride and glycerol are thereby reduced to a minimum, so that the resin product is more waterproof. Furthermore, the cooking need not be carried as close to the gelation point to obtain a sufficiently hard final product. A still further advantage is that the cost is relatively low.

Smaller percentages of coumarone have the same effect to a lesser degree, while larger percentages inhibit the reaction to a greater degree. We prefer to maintain the percentage of coumarone between 10 and 25 of the total, as percentages below 10 have too little effect to warrant their use, and percentages over 25 make the resin too brittle unless the oil content is run up; and increase of the oil content to beyond two-thirds of the glyceryl phthalate content makes the polymerization reaction take such a long time as to be commercially unfeasible.

In the preferred form of our invention then, we maintain the coumarone content between 10 and 25 per cent. of the total, keeping the ratio of oil to glyceryl phthalate between 1 to 2 and 2 to 3. Other oil acids may be used in the reaction in place of linseed acids; we have used tung, soya, and cottonseed acids especially with favorable results. Similarly also, the glycols, and other polyhydric alcohols can be used in place of glycerol.

Other modes of applying the principle of the invention may be employed, change being made as regards the details described, provided the steps or constituents stated in any of the following claims, or the equivalent of such, be employed.

We therefore particularly point out and distinctly claim as our invention:—

1. A method of the character described, which comprises heating together an organic polybasic acid, a polyhdric alcohol, a fatty oil acid, and a polymerized coal tar hydrocarbon resin.

2. A method of the character described, which comprises heating together an organic polybasic acid, a polyhydric alcohol, a fatty oil acid, and a polymerized coumarone resin.

3. A method of the character described, which comprises heating together an organic polybasic acid, a polyhydric alcohol, linseed oil acids, and a polymerized coal tar hydrocarbon resin.

4. A method of the character described, which comprises heating together an organic polybasic acid, a polyhydric alcohol, linseed oil acids, and a polymerized coumarone resin.

5. The resinous product of reaction between an organic polybasic acid, a polyhydric alcohol, a fatty oil acid, and a polymerized coal tar hydrocarbon resin.

6. The resinous product of reaction between an organic polybasic acid, a polyhdric alcohol, a fatty oil acid, and a polymerized coumarone resin.

7. The resinous product of reaction between an organic polybasic acid, a polyhdric alocohol, linseed oil acids, and a polymerized coal tar hydrocarbon resin.

8. The resinous product of reaction between an organic polybasic acid, a polyhydric alcohol, linseed oil acids, and a polymerized coumarone resin.

Signed by us this 26 day of June, 1929.

CHARLES G. MOORE.
MILTON ZUCKER.